(12) United States Patent
Hall

(10) Patent No.: US 11,132,805 B2
(45) Date of Patent: *Sep. 28, 2021

(54) DEPTH MEASUREMENT ASSEMBLY WITH A STRUCTURED LIGHT SOURCE AND A TIME OF FLIGHT CAMERA

(71) Applicant: Facebook Technologies, LLC, Menlo Park, CA (US)

(72) Inventor: Michael Hall, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,213

(22) Filed: Dec. 1, 2020

(65) Prior Publication Data

US 2021/0082134 A1   Mar. 18, 2021

Related U.S. Application Data

(63) Continuation of application No. 16/131,618, filed on Sep. 14, 2018, now Pat. No. 10,916,023.

(51) Int. Cl.
*G06T 7/521* (2017.01)
*G06T 19/00* (2011.01)

(52) U.S. Cl.
CPC ............ *G06T 7/521* (2017.01); *G06T 19/006* (2013.01); *G06T 2207/10152* (2013.01)

(58) Field of Classification Search
CPC ........ G01S 17/89; G01S 17/894; G01S 17/36; G01S 7/4915; G01S 17/86; G01S 17/26; G01S 17/32; G01S 17/46; G01S 17/48; G01S 17/66; G01S 17/88; G01S 7/4813; G01S 7/4914; H04N 13/344; G01B 11/24; G01B 11/25; G01B 11/2527; G02B 2027/0178; G02B 27/017; G06T 7/521;

(Continued)

(56) References Cited

U.S. PATENT DOCUMENTS 9,858,672 B2    1/2018  Trail
10,613,228 B2 *  4/2020  Fenton ................. G01S 7/4876
(Continued)

OTHER PUBLICATIONS

Foix, S. et al. "Lock-in Time-of-Flight (ToF) Cameras: A Survey." IEEE Sensors Journal, vol. 11, No. 9, Sep. 2011, pp. 1917-1926.
(Continued)

*Primary Examiner* — Nathnael Aynalem
(74) *Attorney, Agent, or Firm* — Fenwick & West LLP

(57) ABSTRACT

A depth measurement assembly (DMA) includes an illumination source that projects pulses of light (e.g., structured light) at a temporal pulsing frequency into a local area. The DMA includes a sensor that capture images of the pulses of light reflected from the local area and determines, using one or more of the captured images, one or more TOF phase shifts for the pulses of light. The DMA includes a controller coupled to the sensor and configured to determine a first set of estimated radial distances to an object in the local area based on the one or more TOF phase shifts. The controller determines a second estimated radial distance to the object based on an encoding of structured light and at least one of the captured images. The controller selects an estimated radial distance from the first set of radial distances.

20 Claims, 8 Drawing Sheets

(58) Field of Classification Search
CPC ........................ G06T 7/50; G06T 2207/10152; G06T 19/006
USPC .......................................... 348/47, 134–136
See application file for complete search history.

(56) References Cited

U.S. PATENT DOCUMENTS

| | | |
|---|---|---|
| 10,739,463 B2 | 8/2020 | Koppal et al. |
| 2010/0008588 A1 | 1/2010 | Feldkhun et al. |
| 2011/0188028 A1 | 8/2011 | Hui et al. |
| 2014/0002445 A1 | 1/2014 | Xiong et al. |
| 2014/0028804 A1 | 1/2014 | Usuda et al. |
| 2014/0168369 A1* | 6/2014 | Crane .................. G01S 17/36 348/46 |
| 2014/0267243 A1 | 9/2014 | Venkataraman et al. |
| 2015/0062558 A1 | 3/2015 | Koppal et al. |
| 2016/0260261 A1 | 9/2016 | Hsu |
| 2016/0334509 A1 | 11/2016 | Gruenwald |
| 2018/0247424 A1 | 8/2018 | Bleyer et al. |
| 2018/0253856 A1 | 9/2018 | Price et al. |
| 2018/0260967 A1 | 9/2018 | Bleyer et al. |
| 2019/0068853 A1 | 2/2019 | Price et al. |
| 2020/0103526 A1 | 4/2020 | Morcom |

OTHER PUBLICATIONS

Jayasuriya, S. et al. "Depth Fields: Extending Light Field Techniques to Time-of-Flight Imaging." 2015 International Conference on 3D Vision, Oct. 19-22, 2015, pp. 1-9.

PCT International Search Report and Written Opinion, PCT Application No. PCT/US2018/065387, dated Jun. 11, 2019, 16 pages.

\* cited by examiner

800

802 — Project pulses of light at a pulse rate into a local area

804 — Capture images of pulses of light reflected from the local area

806 — Determine, using one or more of the captured images, one or more time of flight (TOF) phase shifts for the pulses of light 808 — Determine a first set of estimated radial distances to an object in the local area based on the one or more TOF phase shifts 810 — Determine a second estimated radial distance to the object based on an encoding of structured light and at least one of the captured images 812 — Select an estimated radial distance from the first set of radial distances, based in part on the second estimated radial distance

FIG. 8

DEPTH MEASUREMENT ASSEMBLY WITH A STRUCTURED LIGHT SOURCE AND A TIME OF FLIGHT CAMERA

CROSS REFERENCE TO RELATED APPLICATIONS

This application is a continuation of co-pending U.S. application Ser. No. 16/131,618, filed Sep. 14, 2018, which is incorporated by reference in its entirety.

BACKGROUND

The present disclosure relates generally to systems for determining depth of a local area and more specifically to headsets for artificial reality systems that obtain depth information of a local area with a structured light source.

Localizing an object in an arbitrary environment may be useful in a number of different contexts, ranging from artificial reality to autonomous devices. A number of techniques exist to determine a three dimensional mapping of an arbitrary environment. Some rely on a time of flight (TOF) calculation to determine depth information, while others may use structured light patterns. However, both of these techniques have a number of drawbacks. A depth camera that is based on structured light may under-utilize sensor pixel density, the maximum range is limited by the baseline, and the computational costs are generally on the higher side. TOF based depth cameras suffer from multi-path error, as well as require multiple pulsed light frequencies during a single exposure window.

SUMMARY

A structured light-based TOF depth measurement assembly (DMA) is described herein, which leverages the spatial encoding of structured light with a TOF calculation. The DMA may be incorporated into a head mounted display (HMD) to determine depth information in an arbitrary environment. In an artificial reality system, virtual content may be overlaid on top of a user's environment based on the depth information determined by the DMA.

A DMA includes an illumination source which is configured to project pulses of light (e.g., where the intensity pattern is also structured spatially) at a plurality of temporal pulsing frequencies into a local area. The DMA includes a sensor configured to capture images of the pulses of light reflected from a local area and determine, using one or more of the captured images, one or more TOF phase shifts for the pulses of light. The DMA includes a controller coupled to the sensor and configured to determine a first set of estimated radial distances to an object in the local area based on the one or more TOF phase shifts. The controller determines a second estimated radial distance to the object based on an encoding of structured light and at least one of the captured images. The controller selects an estimated radial distance from the first set of radial distances based in part on the second estimated radial distance.

BRIEF DESCRIPTION OF THE DRAWINGS

FIG. 8 is a flow chart of a method for determining a radial distance to an object, in accordance with one or more embodiments.

DETAILED DESCRIPTION OF THE DRAWINGS

Figure 1:
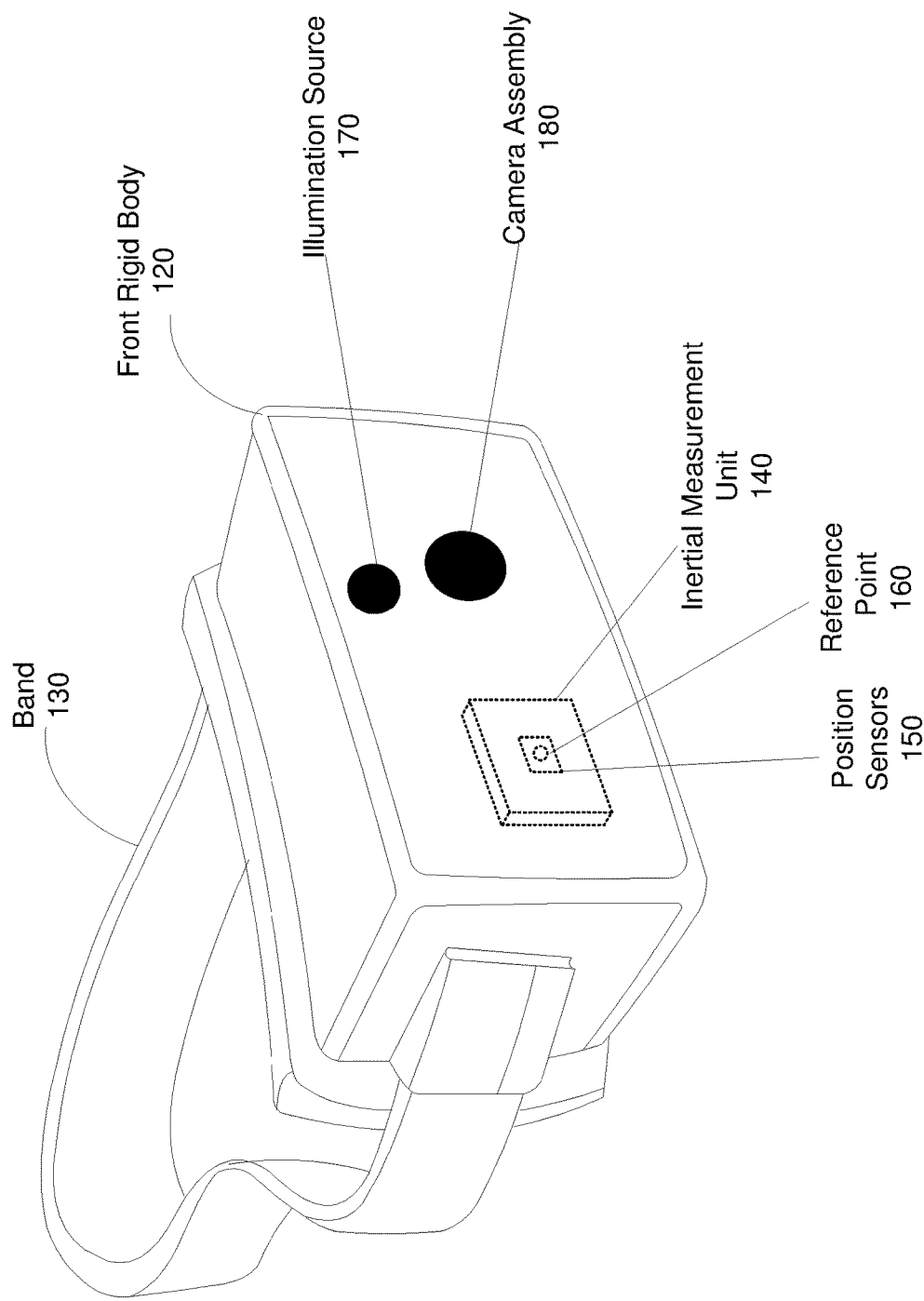
FIG. 1 is a diagram of a HMD, in accordance with one or more embodiments.

Providing artificial reality content to users through a head mounted display (HMD) often relies on localizing a user's position in an arbitrary environment and determining a three dimensional mapping of the surroundings within the arbitrary environment. The user's surroundings within the arbitrary environment may then be represented in a virtual environment or the user's surroundings may be overlaid with additional content.

Conventional HMDs include one or more quantitative depth cameras to determine surroundings of a user within the user's environment. Typically, conventional depth cameras use structured light or time of flight (TOF) to determine the HMD's location within an environment. Structured light depth cameras use an active illumination source to project known patterns into the environment surrounding the HMD. Structured light uses a pattern of light (e.g., dots, lines, fringes, etc.). The pattern is such that some portions of the environment are illuminated (e.g., illuminated with a dot) and others are not (e.g., the space between dots in the pattern). Images of the environment illuminated with the structured light are used to determine depth information. However, a structured light pattern causes signification portions of a resulting image of the projected pattern to not be illuminated. This inefficiently uses the pixel resolution of sensors capturing the resulting image; for example, projection of the pattern by a structured light depth camera results in less than 10% of sensor pixels collecting light from the projected pattern, while requiring multiple sensor pixels to be illuminated to perform a single depth measurement. In addition, the range is limited by the baseline distance between camera and illumination, even if the system is not limited by SNR. Furthermore, to get high quality depth from structured light, the computational complexity can be large.

TOF depth cameras measure a round trip travel time of light projected into the environment surrounding a depth camera and returning to pixels on a sensor array. When a uniform illumination pattern is projected into the environment, TOF depth cameras are capable of measuring depths of different objects in the environment independently via each sensor pixel. However, light incident on a sensor pixel may be a combination of light received from multiple optical paths in the environment surrounding the depth camera. Existing techniques to resolve the optical paths of light incident on a sensor's pixels are computationally complex and do not fully disambiguate between optical paths in the environment. Furthermore, TOF depth cameras often require multiple image captures over more than one illumination pulsing frequency. It is often difficult to maintain an adequate signal to noise ratio performance over a short exposure time, which may limit the ability of the sensor to reduce the total capture time.

A structured light-based TOF depth measurement assembly (DMA) is described herein, which leverages the spatial encoding of structured light with a TOF calculation. The DMA emits structured light or a combination of structured light and uniform flood illumination into a local area. A camera assembly accumulates charge associated with a TOF phase shift, and a controller in signal communication with the camera assembly determines a number of estimated radial distances of an object in the local area based on the TOF phase shifts. Using spatial light encoding, the controller selects one of the estimated radial distances, and combines it with a triangulation calculation to determine depth information of an object. The DMA thus allows for improved efficiency of a camera sensor, since structured light can be detected along with uniform flood light. The DMA also improves the signal to noise ratio performance of conventional TOF depth cameras, since fewer image captures (and associated readout times) are required over the same exposure time. Additional improvements are described in further detail below. The DMA may be incorporated into a head mounted display (HMD) to determine depth information in an arbitrary environment. In an artificial reality system, virtual content may be overlaid on top of a user's environment based on the depth information determined by the DMA.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewer.

FIG. 1 is a diagram of a HMD 100, in accordance with one or more embodiments. The HMD 100 includes a front rigid body 120 and a band 130. In some embodiments, portions of the HMD 100 may be transparent or partially transparent, such as the sides of the HMD 100 on any of the sides of the front rigid body 120. The HMD 100 shown in FIG. 1 also includes an embodiment of a depth measurement assembly (not fully shown) including a camera assembly 180 and an illumination source 170, which are further described below in conjunction with FIGS. 2-9. The front rigid body 120 includes one or more electronic display elements of an electronic display (not shown). The front rigid body 120 optionally includes an inertial measurement unit (IMU) 140, one or more position sensors 150, and a reference point 160.

Figure 2:
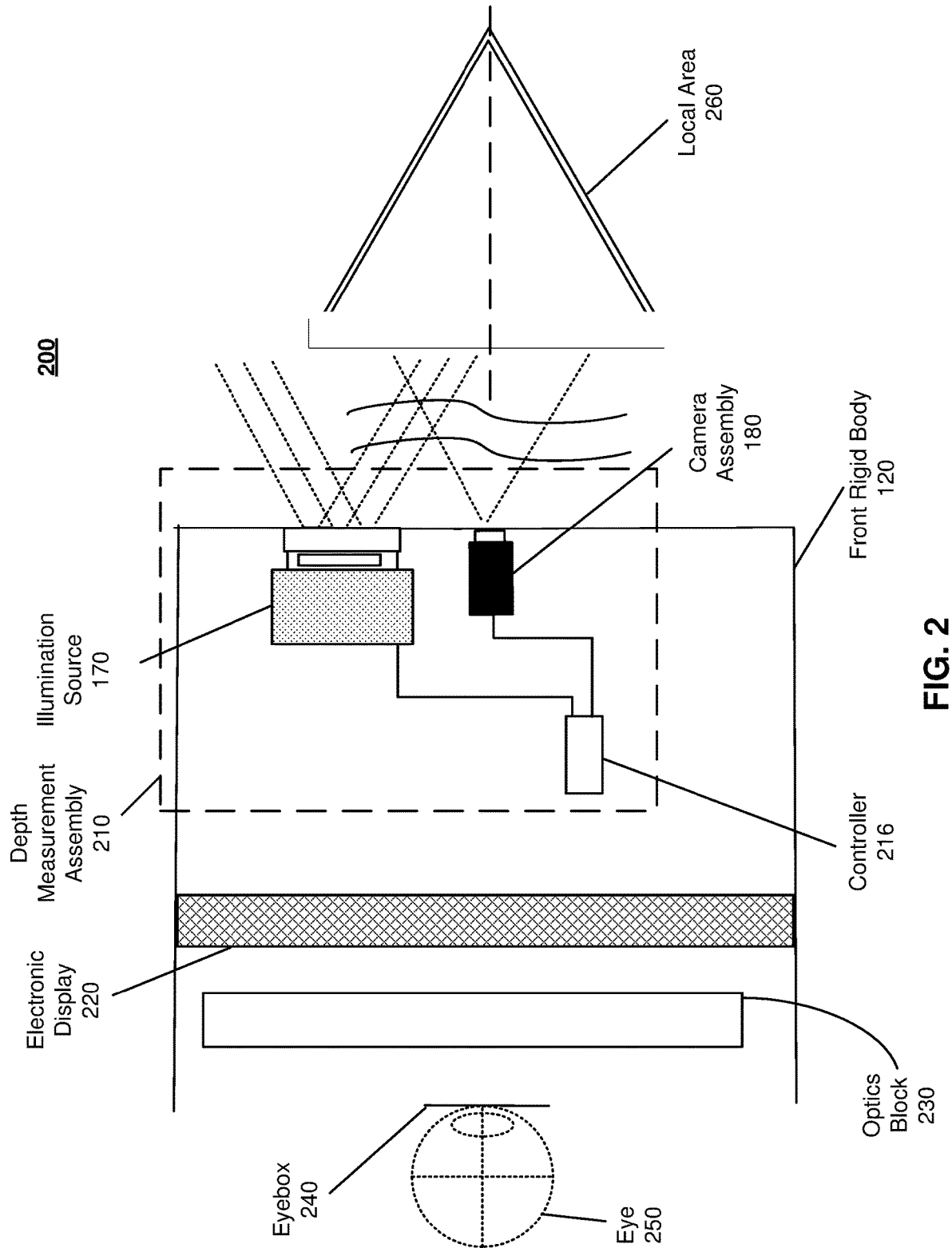
FIG. 2 is a cross section of a front rigid body of an HMD, in accordance with one or more embodiments.

FIG. 2 is a cross section 200 of a front rigid body 120 of the HMD 100 of FIG. 1, in accordance with one or more embodiments. As shown in FIG. 2, the front rigid body 120 includes an electronic display 220 and an optics block 230 that together provide image light to an eye box 240. The eye box 240 is a region in space that is occupied by a user's eye 250. In some embodiments, the front rigid body 120 further includes an eye tracker (not shown) for tracking position of the eye 250 in the eye box 240 (i.e., eye gaze), and a controller 216 coupled to a depth measurement assembly (DMA) 210 and the electronic display 220. For purposes of illustration, FIG. 2 shows a cross section 200 associated with a single eye 250, but another optics block (not shown), separate from the optics block 230, provides altered image light to another eye of the user.

In the embodiment shown by FIG. 2, the HMD 100 includes a DMA 210 comprising the illumination source 170, the camera assembly 180, and a controller 216. Note that in the illustrated embodiments, the DMA 210 is part of the HMD 100. In alternate embodiments, the DMA 210 may be part of a near-eye display, some other HMD, or some device for depth determination. The DMA 210 functions as a structured light-based TOF depth sensor, such as the structured TOF depth sensor 400 as described in further detail with reference to FIG. 4.

In various embodiments, the illumination source 170 emits structured light with an encoded periodic pattern, which may be any structured light pattern, such as a dot pattern, square wave pattern, sinusoid pattern, some other encoded structured light pattern, or some combination thereof. In some embodiments, the illumination source 170 emits structured light that is encoded with a non-periodic pattern (e.g., so that triangulation is not confused by identical periods), such as, e.g., pseudo-random dot patterns are designed to be pseudo-random. In some embodiments, the illumination source 170 emits a series of sinusoids that each have a different phase shift into an environment surrounding the HMD 100. In various embodiments, the illumination source 170 includes an acousto-optic modulator configured to generate a sinusoidal interference pattern. However, in other embodiments the illumination source 170 includes one or more of an acousto-optic device, an electro-optic device, physical optics, optical interference, a diffractive optical device, or any other suitable components configured to generate the periodic illumination pattern.

In various embodiments, the illumination source 170 emits both structured light and uniform flood illumination into the local area 260. For example, the projected pulses of light can be composed of flood illumination overlaid with a structured light dot pattern, where each dot in the dot pattern has a brightness value that is more than a brightness value of the flood illumination. In some embodiments, the illumination source 170 may include a structured light source and a second light source that emits uniform flood illumination. Adding uniform flood illumination to the structured light improves efficiency of a sensor pixel utilization of the camera assembly 180, since the additional light augments any gaps between structured light beams.

In other embodiments, an inverse dot pattern may be projected, whereby a smoothly varying illumination is projected into the area with "dark dots" positioned in various locations. In this embodiment, a dot is a location in the projection that has a brightness value that is at least a threshold amount dimmer than spaces between the dots. In some embodiments, a dot is represented by not emitting light, whereas the space between adjacent dots is represented using at least some level of illumination. For example, the projected pulses of light can be composed of flood illumination overlaid with a structured light dot pattern, where each dot in the dot pattern has a brightness value that is less than a brightness value of the flood illumination. In this scenario, structured light detection may identify regions where illumination is missing, and the TOF measurement will measure radial depth for areas where illumination is projected. The structured light detections can be used as interpolation points to disambiguate adjacent TOF measurements. Accordingly an inverse dot pattern can help increase sensor pixel utilization.

In various embodiments, the illumination source 170 emits light at a pulse rate frequency. A plurality of pulse rate frequencies of light may be emitted into the local area 260 for a single depth measurement. Thus during a single capture window, the illumination source 170 may emit light of different pulse rate frequencies. This is described in further detail with reference to FIGS. 5-8.

The camera assembly 180 captures images of the local area 260. The camera assembly includes one or more cameras that are sensitive to light emitted from the illumination source 170. At least one of the one or more cameras in the camera assembly 180 is used to detect structured light and in a structured TOF depth sensor, such as the structured TOF depth sensor 400 as described in further detail with reference to FIG. 4. In some embodiments, the one or more cameras may also be sensitive to light in other bands (e.g., visible light). The captured images are used to calculate depths relative to the HMD 100 of various locations within the local area 260, as further described below in conjunction with FIGS. 3-9. The front rigid body 120 also has an optical axis corresponding to a path along which light propagates through the front rigid body 120. In some embodiments, the camera assembly 180 is positioned along the optical axis and captures images of a local area 260, which is a portion of an environment surrounding the front rigid body 120 within a field of view of the camera assembly 180. Objects within the local area 260 reflect incident ambient light as well as light projected by the illumination source 170, which is subsequently captured by the camera assembly 180.

The camera assembly 180 captures images of the periodic illumination patterns projected onto the local area 260 using a sensor comprising multiple pixels. The sensor may be the sensor 404 as described in further detail with reference to FIG. 4. A sensor of the camera assembly 180 may be comprised of a 2-dimensional array of pixels. Each pixel captures intensity of light emitted by the illumination source 170 from the local area 260. Thus the sensor of the camera assembly 180 may detect structured light emitted by the illumination source 170 and reflected from the local area 260, or a combination of structured light and uniform flood illumination and/or ambient light reflected from the local area 260. In some embodiments, the pixels detect phase shifts of different phases and light pulse frequencies. In some embodiments, the pixels of a sensor detect different phases and light pulse frequencies in sequential capture windows. In some embodiments, the pixels of a sensor of the camera assembly 180 are augmented pixels that have more than one on-pixel charge storage regions (also referred to as bins), and collect charge of different phases during a single capture window. These embodiments are described in further detail with respect to FIGS. 6A-7.

The controller 216 determines depth information using information (e.g., images) captured by the camera assembly 180. The controller 216 estimates depths of objects in the local area 260. The controller 216 receives charge information from a sensor of the camera assembly 180. The sensor of the camera assembly 180 accumulates charge associated with different phases of light. The sensor of the camera assembly 180 conveys the charge information to the controller 216. The controller 216 estimates radial depth information based on the phase shift of the structured light detected by the camera assembly 180. The structured light encoding is then used to disambiguate between the estimated depths from a TOF calculation. This process is described in further detail with reference to FIGS. 3-9. The controller 216 is described in further detail with reference to FIG. 9.

The electronic display 220 may be configured to display images to the user in accordance with data received from a console (not shown in FIG. 1B), such as the console 910 as described in further detail with reference to FIG. 9. The electronic display 220 may emit, during a defined time period, a plurality of images. In various embodiments, the electronic display 220 may comprise a single electronic display or multiple electronic displays (e.g., a display for each eye of a user). Examples of the electronic display include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof.

The optics block 230 magnifies image light received from the electronic display 220, corrects optical aberrations associated with the image light, and the corrected image light is presented to a user of the HMD 100. At least one optical element of the optics block 230 may be an aperture, a Fresnel lens, a refractive lens, a reflective surface, a diffractive element, a waveguide, a filter, or any other suitable optical element that affects the image light emitted from the electronic display 220. Moreover, the optics block 230 may include combinations of different optical elements. In some embodiments, one or more of the optical elements in the optics block 230 may have one or more coatings, such as anti-reflective coatings, dichroic coatings, etc. Magnification of the image light by the optics block 230 allows elements of the electronic display 220 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the field-of-view. Additionally, in some embodiments, the amount of magnification may be adjusted by adding or removing optical elements.

Figure 3:
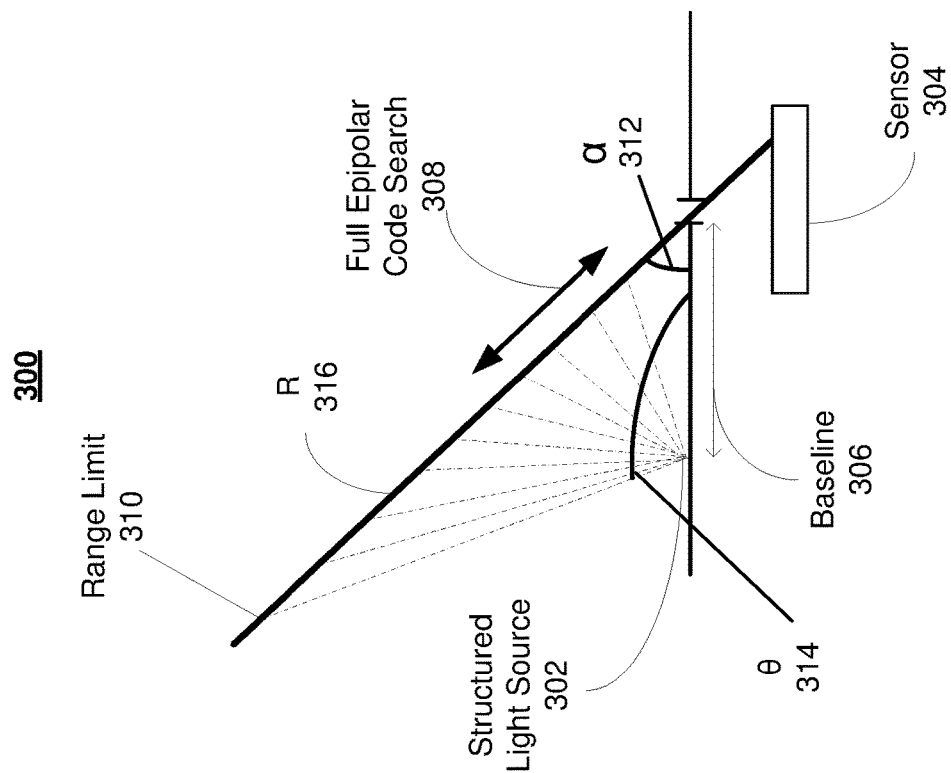
FIG. 3 is a diagram of operation of a conventional structured light DMA, in accordance with one or more embodiments.

FIG. 3 is a diagram of operation of a conventional structured light based depth determination device 300, in accordance with one or more embodiments. In a conventional structured light based depth determination device, a structured light source 302 emits structured light into an environment. The structured light has an encoded structured pattern and may be pulsed at a pulse frequency. The structured light is projected into an environment, and may reflect off of a surface or any three dimensional object in the environment back towards the sensor 304. Any surface or three dimensional object in the environment distorts the output pattern from the structured light source 302. Using a triangulation calculation, a controller (not shown) that receives information from the sensor 304 can compare the distorted pattern to the emitted pattern to determine a distance R 316 of an object in the environment from the sensor 304.

The triangulation calculation relies on the following relationship:

$$R = B \frac{\sin(\theta)}{\sin(\alpha + \theta)} \quad (1)$$

where R is the distance R 316 of an object from the sensor 304, B is the baseline 306 distance from the structured light source 302 to the sensor 304, θ is θ 314 the angle between the projected light and the baseline 306, and α is a 312 the angle between the reflected light off of an object and the sensor surface 304. The baseline distance 306 B and the emitted light angle θ 314 are fixed and defined by the structure of the structured light based depth determination device and the encoded structured light. To determine a 312, a controller compares the 2-dimensional image of pixel intensities to the known structured pattern to identify the originating pattern from the structured light source 302. In a conventional structured light based depth determination device, this process would entail a full epipolar code search 308 across the full range of the structured light encoding. Following determining the value of α 312, the controller carries out a triangulation calculation using the relationship (1).

This conventional method of determining the location of an object in the environment has a number of drawbacks. The full epipolar code search 308 may require longer computational time, thus increasing the time between output light from the structured light source 302 and a controller registering the presence and location of an object in the environment. This delay may be noticeable in an example in which the conventional structure light based depth determination device is used in an artificial reality system, since determination of the location of an object may be a step in displaying virtual content to a user, leading to a visual lag in the displayed image. Additionally, the conventional structured light based depth determination device has a range limit 310 that is defined by the baseline 306 distance from the structured light source 302 to the sensor 304. The longer the distance of the baseline 306 between the structured light source 302 to the sensor 304, the greater the depth range of the conventional structured light based depth determination device. In cases where the conventional structured light based depth determination device is incorporated into another device for which a form factor is important, this may lead to a range limit of a device or a size constraint on the device in order to achieve a large enough range. Furthermore, structured light contains patterned constellations of light surrounded by areas without illumination. This leads to a significant non-illuminated portion of the image, which is some cases may lead to underutilization of the pixels in a sensor, if the sensor 304 is a pixel-based sensor (e.g., less than 10% of a sensor array collects light from the active structured light source 302).

Figure 4:
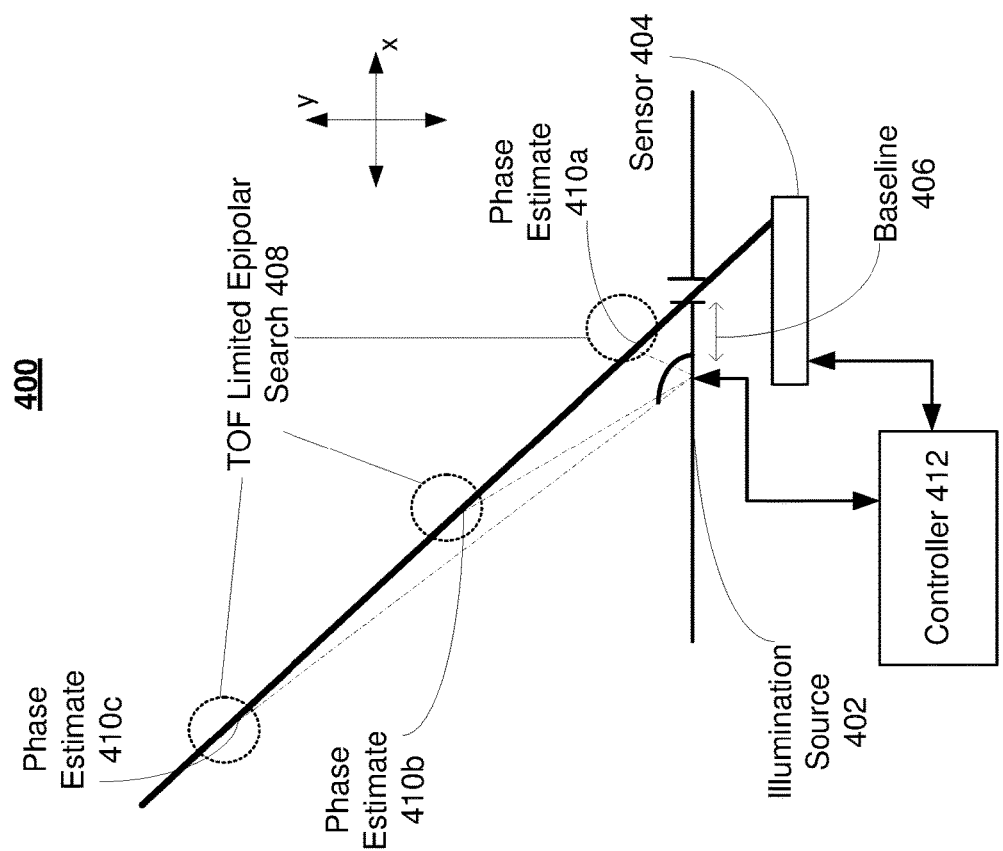
FIG. 4 is a diagram of operation of a structured TOF depth sensor, in accordance with one or more embodiments.

FIG. 4 is a diagram of a structured TOF depth sensor 400, in accordance with one or more embodiments. The structured TOF depth sensor 400 may be an embodiment of the DMA 210. In a structured TOF depth sensor 400, an illumination source 402 is combined with a TOF sensor 404 to leverage both a TOF calculation with a structured light encoding. The illumination source 402 may be the illumination source 170, while the TOF sensor 404 may be part of the camera assembly 180. The structured TOF depth sensor 400 also includes a controller 412, which may be the controller 216 of the DMA 210 as described in further detail with reference to FIG. 2. The combination of the structured light encoding with a TOF calculation allows for a reduced baseline 406 in comparison to the baseline 306 without sacrificing the depth of the sensing range. The structured TOF depth sensor 400 also reduces the computation associated with a code search, since a TOF calculation limits the full epipolar code search 308 to a TOF limited epipolar search 408. This is described in further detail below.

In some embodiments, the illumination source 402 emits structured light into an environment, such as the local area 260. The illumination source 402 may emit structured light at one or more pulse frequency rates. In some examples, the illumination source 402 sequentially emits structured light at different temporal pulsing frequency rates. This is described in further detail with reference to FIGS. 5-9. In some embodiments, the illumination source 402 emits any structured light pattern, such as a symmetric or quasi-random dot pattern, grid, horizontal bars, a periodic structure, or any other pattern. The structured light is projected into an environment, and may reflect off of a surface or any three dimensional object in the environment. The reflected structured light is then directed from the object back towards the sensor 404. In some embodiments, the illumination source 402 or any other light source described herein emits structured light simultaneously and in addition to a uniform flood illumination. Thus the illumination source 402 may emit both structured light and uniform flood illumination. In other embodiments, the illumination source 402 or any other light source described herein may emit structured light, and a second light source emits uniform flood illumination.

The sensor 404 may be a fast photodiode array, or any other TOF sensor with a two-dimensional pixel array. The sensor 404 may be one of the sensors located in the camera assembly 180. The controller 412 determines, from information provided by the sensor 404, a time that light has taken to travel from the illumination source 402 to the object in the environment and back to the sensor 404 plane. This may be determined by accumulating charge at a pixel associated with different phases of reflected light. The pixel information is conveyed to the controller 412, which then performs a TOF phase shift calculation to generate estimated radial depths of an object in a local area. In some examples, the sensor 404 may measure different sets of phase shifts for different output pulse frequencies of the illumination source 402 during different exposure windows. This is described in further detail with reference to FIGS. 5-9. Unlike the sensor 304 in a conventional structured light based depth determination device, the sensor 404 thus measures a plurality of phase shifts of the structured light source, rather than accumulating charge for computing a triangulation measurement.

Referring to FIG. 4, a controller 412 causes an illumination source 402 to emits pulsed structured light two different pulsing frequencies (e.g., 40 MHz and 100 MHz). A sensor 404 captures reflected pulses, and the controller determines a set of possible distances using the captured data and TOF depth determination techniques.

The TOF measurement of the illumination source 402 produced from the plurality of phase shifts detected by the sensor 404 may not be fully disambiguated. For example, using a single temporal pulsing frequency, the TOF measurement of the controller 412 may produce several depth estimates that each result from a 2π ambiguity in the TOF calculation. Thus the TOF measurement may result in a plurality of phase shift estimates that each are possible solutions to a TOF calculation and are separated from each other by a factor of 2π. Each of the plurality of phase shift estimates results in a different depth measurement of an object. This is shown in FIG. 4 as the phase estimate 410a, phase estimate 410b and phase estimate 410c (collectively 410). Estimates 410 define discrete regions of possible radial depth of a detected object in an environment.

To distinguish between the depth estimates produced from the TOF calculation, the controller 412 uses depth information from structured light in at least one of the images captured by the sensor 404. Thus the controller 412 may compare the image produced by the sensor 404 to the encoding of the illumination source 402 pattern. The controller 412 may be the controller 216 as shown in FIG. 2. This may be done by the controller 412 using a lookup table (LUT) containing the structured light encoding. Thus instead of a full epipolar code search 308, the controller 412 performs a TOF limited epipolar search 408 in the regions of the estimates made with a TOF calculation. By comparing the image from the sensor 404 to the structured light encoding, the controller 412 disambiguates the TOF estimate and selects one of the phase estimates as the correct phase and the corresponding correct radial distance from a set of radial depth estimates. Note that the use of TOF along with SL allows for quick determination of depth, and can use a relatively small baseline (as an accuracy of the SL only has to be enough to disambiguate the more accurate TOF measurements. Accordingly, the structured TOF depth sensor allows for a smaller baseline 406 in comparison to the baseline 306. In some examples, the baseline 406 may be 50 mm or less (e.g., 10 mm).

Figure 5:
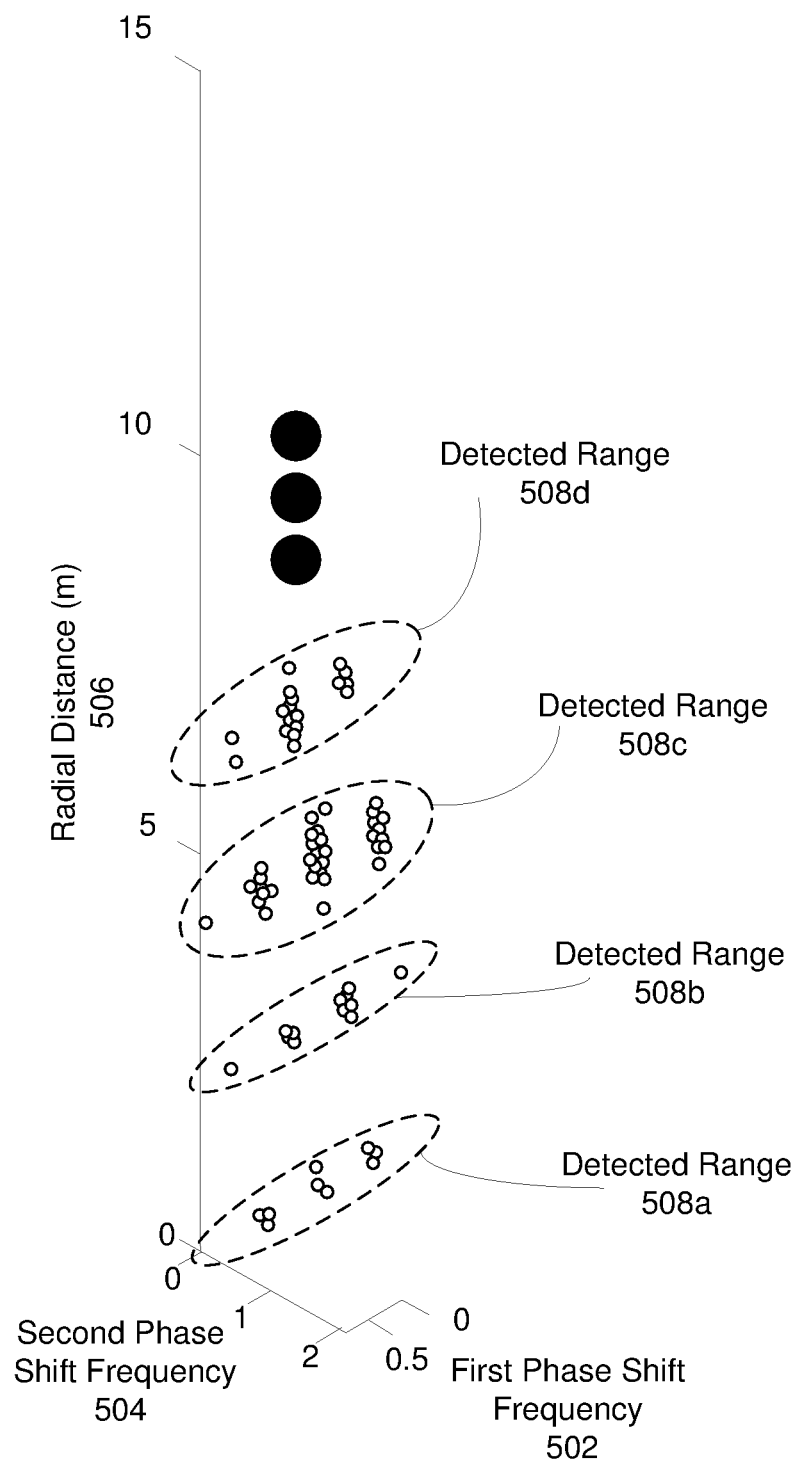
FIG. 5 is a portion of a phase map of a structured TOF depth sensor, in accordance with one or more embodiments.

FIG. 5 is a portion of a phase map 500 of a structured TOF depth sensor, in accordance with one or more embodiments. In some examples, the phase map 500 is produced from a structured TOF depth sensor, as described in FIG. 4. Thus the phase map 500 may be detected by the sensor 404 as described in further detail with reference to FIG. 4. The phase map 500 shows the disambiguated depth estimates produced from a TOF calculation following emission of structured light at two different pulse frequencies.

A structured light source may project structured light at a first phase shift frequency 502 into an environment. The first phase shift frequency 502 is a phase shift between 0 and 2π that corresponds to a first temporal frequency at which pulses are output (e.g. typical ranges are 1-350 MHz, but could possibly go even higher, e.g., up to 1 GHz). The structured light source may then project structured light at a second phase shift frequency 504 that is different from the first phase shift frequency 502. The second phase shift frequency 504 is a phase shift between 0 and 2π that corresponds to a second temporal frequency at which pulses are output. For example, the structured light projector may output pulses at 10 MHz and may also emit pulses at 50 MHz. In some examples, the light emitted into a local environment at the first phase shift frequency 502 may be structured light, whereas the light emitted into a local environment at a second phase shift frequency 504 may be uniform flood light or any non-encoded light. The projection of light at the first phase shift frequency 502 and the second phase shift frequency 504 may be at different times, and correspond to different exposures windows of a sensor (e.g., the sensor 404). Timing of the structured light projection and sensing windows is described in further detail with reference to FIGS. 6A-7.

The phase map 500 shows the ambiguity in the TOF calculation. The y-axis shows the radial distance 506. The phase map 500 represents the detection of an object in an environment at a distance from a structured TOF depth sensor. The set of detected ranges, 508a, 508b, 508c, and 508d (collectively 508) each represent phase-wrapped solutions to a TOF calculation and correspond to a set of estimated radial distances based on a phase shift detected by a sensor. Note what is illustrated is really only a portion of the phase map 500 as there would be extra sets of detected ranges proceeding out to infinity (note in practice, the range may be limited by the amount of light emitted into the scene and the reflectivity of the objects being imaged) which are omitted for ease of illustration. The set of detected ranges 508 are referred to herein as estimated radial distances. Thus the solutions in the detected range 508a are separated by the detected range 508b by a 2π phase ambiguity as described in further detail above. For example, each of the detected ranges 508 may correspond to the regions shown in FIG. 4 of the TOF limited epipolar search 408 and the phase estimates 410a, 410b and 410c. Using the phase map 500, a controller compares the detected ranges 508 to a structured light encoding. The controller may be the controller 412. The structured light encoding may be stored in a look up table (LUT). Thus instead of a full epipolar code search 308, a controller performs a TOF limited epipolar search 408 in the regions of the estimates made with a TOF calculation. In some embodiments, based on a comparison between the detected ranges 508 and a LUT, the controller selects one of the detected ranges 508. The controller then performs a triangulation calculation using the relationship (1) to produce a triangulation depth estimate. In some embodiments, a controller may divide a local area illuminated by an illumination source into a number of different regions. In some embodiments, the controller identifies a corresponding region of estimated radial distances from a TOF calculation to region of triangulation depth estimates. The controller thus matches regions of TOF calculations to regions of triangulation depth estimates. In some embodiments, the controller then selects the radial depth estimate that is within a threshold distance of the triangulation depth estimate. In some embodiments, the controller selects the estimated radial distance based in part on a LUT and the second estimated radial distance. In some embodiments, the controller selects the estimated radial distance using machine learning. In some embodiments, in regions without structured light illumination or triangulation depth estimates, a controller may back-fill estimated radial distances from TOF calculations and/or interpolate between regions. In terms of interpolation, in some embodiments a uniform illumination pattern is modulated at some regions with brighter spots (e.g. dots) or null spots (e.g. dark dots—inverse dot pattern). In this scenario, nearly all pixels would have TOF information, thus increasing their utility, whereas only a subset would have SL information. But the SL information could be used to locally disambiguate neighboring regions of TOF estimates via, for example, local interpolation. Thus one of the estimated ranges in the detected ranges 508 is selected as the true distance of an object by comparing the results of the triangulation calculation to the detected ranges.

Combining the TOF calculation based on a phase shift with a triangulation calculation based on the structured light encoding allows for disambiguation of the TOF phase shift solutions shown in the phase map 500 without the need for detection of an object with additional output light frequencies. Thus the total number of TOF captures within a limited exposure window of a sensor can be reduced, which is discussed in further detail below. The structured light TOF sensor also allows for reduced accuracy in a triangulation structured light calculation, since the structured light estimate may only need to be precise enough to disambiguate between the solutions of the TOF calculation, i.e., between each of the detected ranges 508, rather than across a full depth range, as shown in FIG. 4. This also allows for a substantial decrease in the baseline distance between a structured light source and a sensor (such as the baseline 406) without sacrificing the detection capabilities of the structured light TOF sensor. A reduced baseline may allow for a smaller form factor of an HMD or any other device in which a structured TOF sensor is incorporated. In addition, the complexity of the structured light computational algorithm can be reduced since lower accuracy and precision is required. In some embodiments, the accuracy of the structured light estimation may be in the range of 0.5 to 3 meters.

Combining the structured light encoding with the TOF solutions additionally reduces multi-path artifacts from the TOF sensing, which is a source of error in conventional TOF sensing. In a conventional TOF sensor, it is difficult to distinguish between light incident on the sensor that is reflected off of an object and light that has made several reflections before reaching the sensor (i.e. multi-path light). However, by comparing TOF solutions to a structured light encoding, signals that do not match the structured light pattern can be rejected and removed from depth estimates.

Figure 6A:
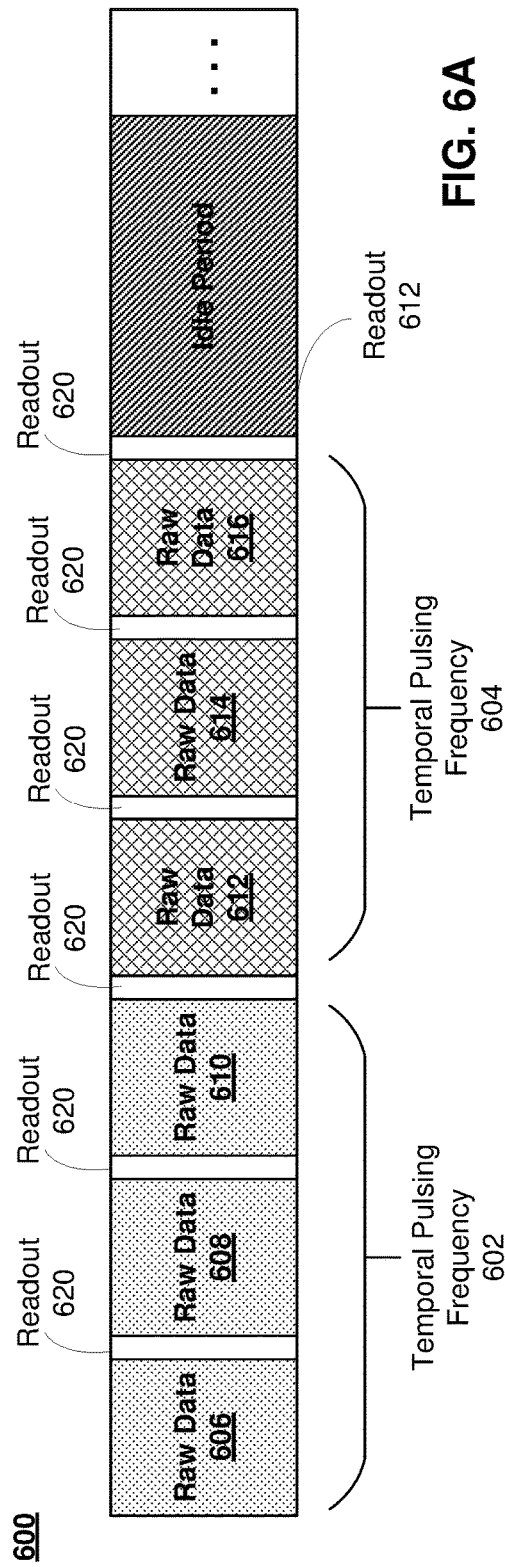
FIG. 6A is a pixel timing diagram for a structured TOF depth sensor with three capture windows, in accordance with one or more embodiments.

FIG. 6A is a pixel timing diagram 600 for a structured TOF depth sensor with three raw capture windows, in accordance with one or more embodiments. The pixel timing diagram 600 may be for pixels located on the sensor 404 as shown in FIG. 4. A temporal pulsing frequency 602 and a temporal pulsing frequency 610 may refer to pulses produced by the illumination source 402. The pixel timing diagram 600 captures light from the illumination source 402 that is reflected from the local area as raw data. The pixel timing diagram 600 is an improvement over other conventional pixel timing diagrams, since the combination of the structured light encoding with TOF depth estimates allows for fewer total captures within a single exposure window. Thus, timing windows that were previously used for sensor charge readout and/or additional image captures can now be used for additional image exposure, increasing SNR and therefore depth precision.

In a structured TOF depth sensor (e.g., the structured TOF depth sensor 400), an exposure window has at least three capture windows of raw data per temporal pulsing frequency, allowing for a reduction in the total number of captures and an improvement in signal-to-noise ratio during each of the phase captures. In some embodiments, there may be more than three capture windows for each temporal pulsing frequency. In some embodiments, there may be more than two temporal pulsing frequencies. In some embodiments, the number of capture windows for to different temporal pulsing frequencies is different from each other (e.g., 4 for a first temporal pulsing frequency and 3 for a second temporal pulsing frequency).

In the illustrated figure, there are three capture windows of raw data at each temporal pulsing frequency, specifically raw data 604, 606, 608 at the temporal pulsing frequency 602, and raw data 612, 614, and 616 at the temporal pulsing frequency 604. Note that there is a phase difference between each raw data for each temporal pulsing frequency. For example, the raw data 606, the raw data 608 and the raw data 610, while all are at the same temporal pulsing frequency 602 (e.g., 10 MHz), all are raw intensity images acquired for different phase offsets between the sensor 404 and the light reflected from the local area from the illumination source 402. In the same manner, the raw data 612, the raw data 614, and the raw data 616 all are raw intensity images acquired for different phase offsets between the sensor 404 and the light reflected from the local area from the illumination source 402. The difference in phase may be accomplished by, e.g., adjusting a gated shutter window that controls a time when a pulse is emitted and/or when the structured TOF depth sensor is active relative to when a pulse is emitted. Each raw data corresponds to at least one pulse detected from the illumination source 402 that is reflected from the local area. In practice, each detected pulse may have a low signal-to-noise (SNR) value, and multiple detected pulses (e.g., 100s, 1000s, etc.) are captured (to increase SNR) to make up a single raw data before the captured raw data is read out. As discussed below, the raw data for each temporal pulsing frequency is used by the structured TOF depth sensor to determine a corresponding aggregate phase.

A structured light illumination source (e.g., the illumination source 402) projects structured light at the first temporal pulsing frequency 602 into an environment, where the projected structured light has a first phase. During this first time period, the structured TOF depth sensor is capturing reflected pulses as raw data 606. After some threshold number of time has passed (e.g., corresponding to a threshold number of detected pulses) the structured light illumination source performs a readout 620 of the raw data 606. The structured TOF depth sensor then alters the phase to a second phase that is different from the first phase (e.g., corresponding to a different timing offset between illumination pulses and sensor shutter timing), and projects structured light at the first temporal pulsing frequency 602 into the environment, where the projected structured light has the second phase. During this time period, the structured TOF depth sensor is capturing reflected pulses as raw data 608. After some threshold number of time has passed (e.g., corresponding to a threshold number of detected pulses) the structured light illumination source performs a readout 620 of the raw data 608. The structured TOF depth sensor then alters the phase to a third phase that is different from the first and second phases, and projects structured light at the first temporal pulsing frequency 602 into the environment, where the projected structured light has the third phase. During this time period, the structured TOF depth sensor is capturing reflected pulses as raw data 610. After some threshold number of time has passed (e.g., corresponding to a threshold number of detected pulses) the structured light illumination source performs a readout 620 of the raw data 610. The raw data 606, the raw data 608, and the raw data 610 are used by the structured TOF depth sensor to determine a first aggregate phase for the temporal pulsing frequency 602. Note that an aggregate phase has a plurality of values that can differ from pixel to pixel.

Following these three capture windows and their associated readouts 120, the structured light illumination source projects structured light at the second temporal pulsing frequency 604 into an environment, where the projected structured light has a first phase. During this time period, the structured TOF depth sensor is capturing reflected pulses as raw data 612. After some threshold number of time has passed (e.g., corresponding to a threshold number of detected pulses) the structured light illumination source performs a readout 620 of the raw data 612. The structure light illumination source then alters the phase to a second phase that is different from the first phase, and projects structured light at the second temporal pulsing frequency 602 into the environment, where the projected structured light has the second phase. During this time period, the structured TOF depth sensor is capturing reflected pulses as raw data 614. After some threshold number of time has passed (e.g., corresponding to a threshold number of detected pulses) the structured light illumination source performs a readout 620 of the raw data 614. The structure light illumination source then alters the phase to a third phase that is different from the first and second phases, and projects structured light at the second temporal pulsing frequency 604 into the environment, where the projected structured light has the third phase. During this time period, the structured TOF depth sensor is capturing reflected pulses as raw data 616. After some threshold number of time has passed (e.g., corresponding to a threshold number of detected pulses) the structured light illumination source performs a readout 620 of the raw data 616. The raw data 612, the raw data 614, and the raw data 616 are used by the structured TOF depth sensor to determine a second aggregate phase for the temporal pulsing frequency 604.

While the TOF depth estimates may not be fully disambiguated as a result of the phase measurements from the temporal pulsing frequency 602 and the temporal pulsing frequency 604, unlike in a conventional TOF sensor, this does not lead to a difficulty in determining depth information since the phase generated depth estimates are later fully disambiguated by a structured light encoding. Because the total exposure time is divided between fewer captions, the signal-to-noise ratio of the signals detected during each of the phase captures may be better than in a conventional TOF sensor, leading to improved TOF depth estimates. The idle period is period of time before capture of the raw data 606 repeats.

Figure 6B:
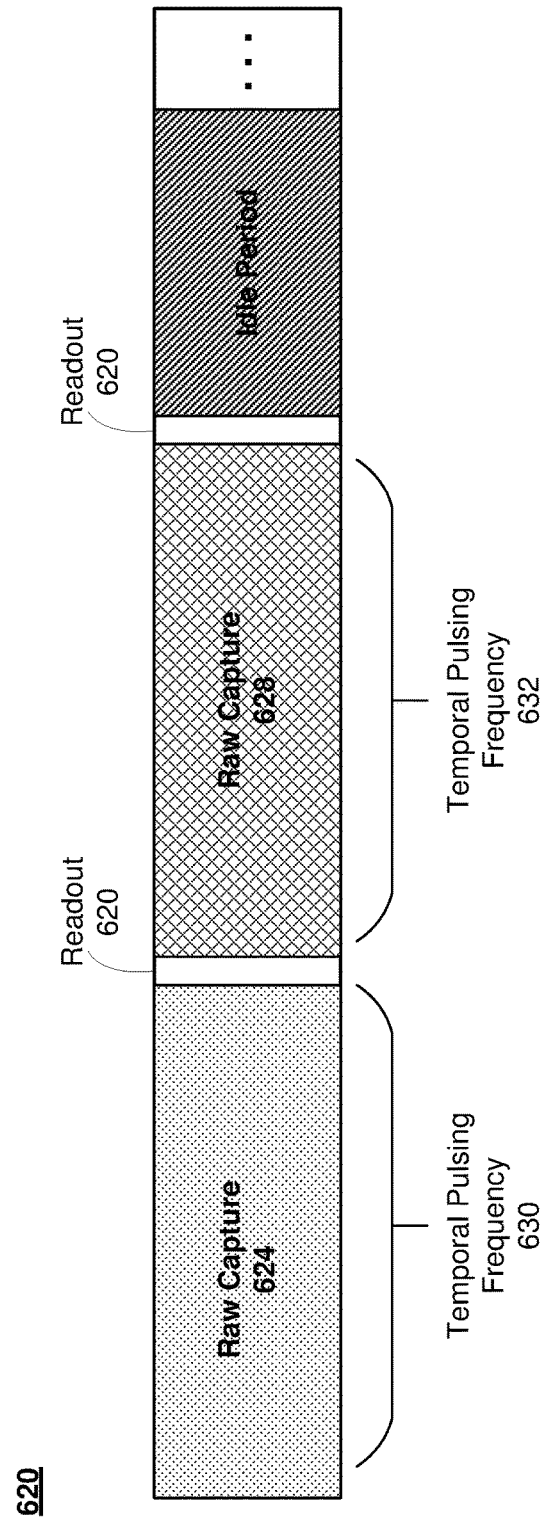
FIG. 6B is a pixel timing diagram for a structured TOF depth sensor with augmented pixels, in accordance with one or more embodiments.

FIG. 6B is a pixel timing diagram 620 for a structured TOF depth sensor with augmented pixels, in accordance with one or more embodiments. The pixel timing diagram 620 may be used for sensors with augmented pixels that each contain multiple charge storage regions (e.g., 3 or more charge storage regions) that store charge separately. An augmented pixel may be fast photodiode sensor that are configured to sequentially store excited photo-electrons into at least three different on-pixel storage sites.

In the illustrated figure, there is one capture window of raw data at each temporal pulsing frequency, specifically raw capture 624 and raw capture 628 at temporal pulsing frequency 630 and temporal pulsing frequency 632, respectively. Note that within each raw capture there are actually multiple captures of raw data at different phases, where each of the different phases is captured in a different charge storage region. For example, in the case of an augmented pixel including three charge storage regions, the raw capture 624 is subdivided into a series of captures of raw data at three different phases, e.g., corresponding to first phase, a second phase, and third phase. Each raw data corresponds to at least one pulse detected from the illumination source 402 that is reflected from the local area. As noted above, in practice, each detected pulse may have a low SNR value, and multiple detected pulses (e.g., 100s, 1000s, etc.) are captured (to increase SNR) to make up a single raw data before the captured raw data is readout.

In some embodiments, the raw capture 624 and the raw capture 628 captures raw data in an interleaved manner. For example, the structured light illumination source (e.g., the illumination source 402) projects structured light at the temporal pulsing frequency 630 into an environment, where the projected structured light has a first phase. The structured TOF depth sensor captures raw data for a single pulse corresponding to the first phase which is stored in charge storage region 1 for each of the augmented pixels. The structured TOF depth sensor then alters the phase (e.g., using a gated shutter window) to a second phase that is different from the first phase, and projects structured light at the temporal pulsing frequency 630 into the environment, where the projected structured light has the second phase. The structured TOF depth sensor captures raw data for a single pulse corresponding to the second phase which is stored in charge storage region 2 for each of the augmented pixels. The structured TOF depth sensor then alters the phase to a third phase that is different from the first phase and the second phase, and projects structured light at the temporal pulsing frequency 630 into the environment, where the projected structured light has the third phase. The structured TOF depth sensor captures raw data for a single pulse corresponding to the third phase which is stored in charge storage region 3 for each of the augmented pixels. This process then repeats in series some number of times, after which the captured raw data in charge storage regions 1, 2, and 3 for each of the pixels is readout 620. The number of times being based on an estimated SNR for the captured raw data for each of the three phases. The raw data in the raw capture 624 from the three charge storage regions of each pixel are used by the structured TOF depth sensor to determine a first aggregate phase for the temporal pulsing frequency 630.

The process then repeats using a temporal pulsing frequency 632, which is different from the temporal pulsing frequency 630 (e.g., the temporal pulsing frequency 632 may be 40 MHz and the temporal pulsing frequency 630 may be 100 MHz). The structured light illumination source projects structured light at the temporal pulsing frequency 632 into an environment, where the projected structured light has a first phase. The structured TOF depth sensor captures raw data for a single pulse corresponding to the first phase which is stored in charge storage region 1 for each of the augmented pixels. The structured TOF depth sensor then alters the phase to a second phase that is different from the first phase, and projects structured light at the temporal pulsing frequency 632 into the environment, where the projected structured light has the second phase. The structured TOF depth sensor captures raw data for a single pulse corresponding to the second phase which is stored in charge storage region 2 for each of the augmented pixels. The structured TOF depth sensor then alters the phase to a third phase that is different from the first phase and the second phase, and projects structured light at the temporal pulsing frequency 632 into the environment, where the projected structured light has the third phase. The structured TOF depth sensor captures raw data for a single pulse corresponding to the third phase which is stored in charge storage region 3 for each of the augmented pixels. This process then repeats in series some number of times, after which the captured raw data in charge storage regions 1, 2, and 3 for each of the augmented pixels is readout 620. The number of times being based on an estimated SNR for the captured raw data for each of the three phases. The raw data in the raw capture 628 from the three charge storage regions of each pixel is used by the structured TOF depth sensor to determine a second aggregate phase for the temporal pulsing frequency 632.

Note that in the above example, the raw capture 624 and the raw capture 628 captures raw data in an interleaved manner. However, in other embodiments raw data may be captured in other orders, e.g., a linear manner. For example, instead of moving from charge storage region 1, to charge storage region 2, to charge storage region 3, and then back to charge storage region 1 on a pulse by pulse basis building the SNR for each of these in an incremental manner, the structured TOF depth sensor may capture raw data in charge storage regions 1 (first phase) for a number of times corresponding to a target SNR, adjust the phase to the second phase and capture raw data in charge storage regions 2 (second phase) for a number of times corresponding to a target SNR, and adjust the phase to the third phase and capture raw data in charge storage regions 3 (second phase) for a number of times corresponding to a target SNR. The idle period is period of time before the raw capture 624 repeats.

Similarly to the timing diagram 600, the timing diagram 620 may not allow for the full disambiguation of the TOF depth estimates, but with the addition of the structured light encoding, the depth estimate may be later fully disambiguated. Note that relative to FIG. 6A there are substantially less readouts 120 in 6B, which allows for better optimization of time usage (e.g., less loss of time to readouts).

Figure 7:
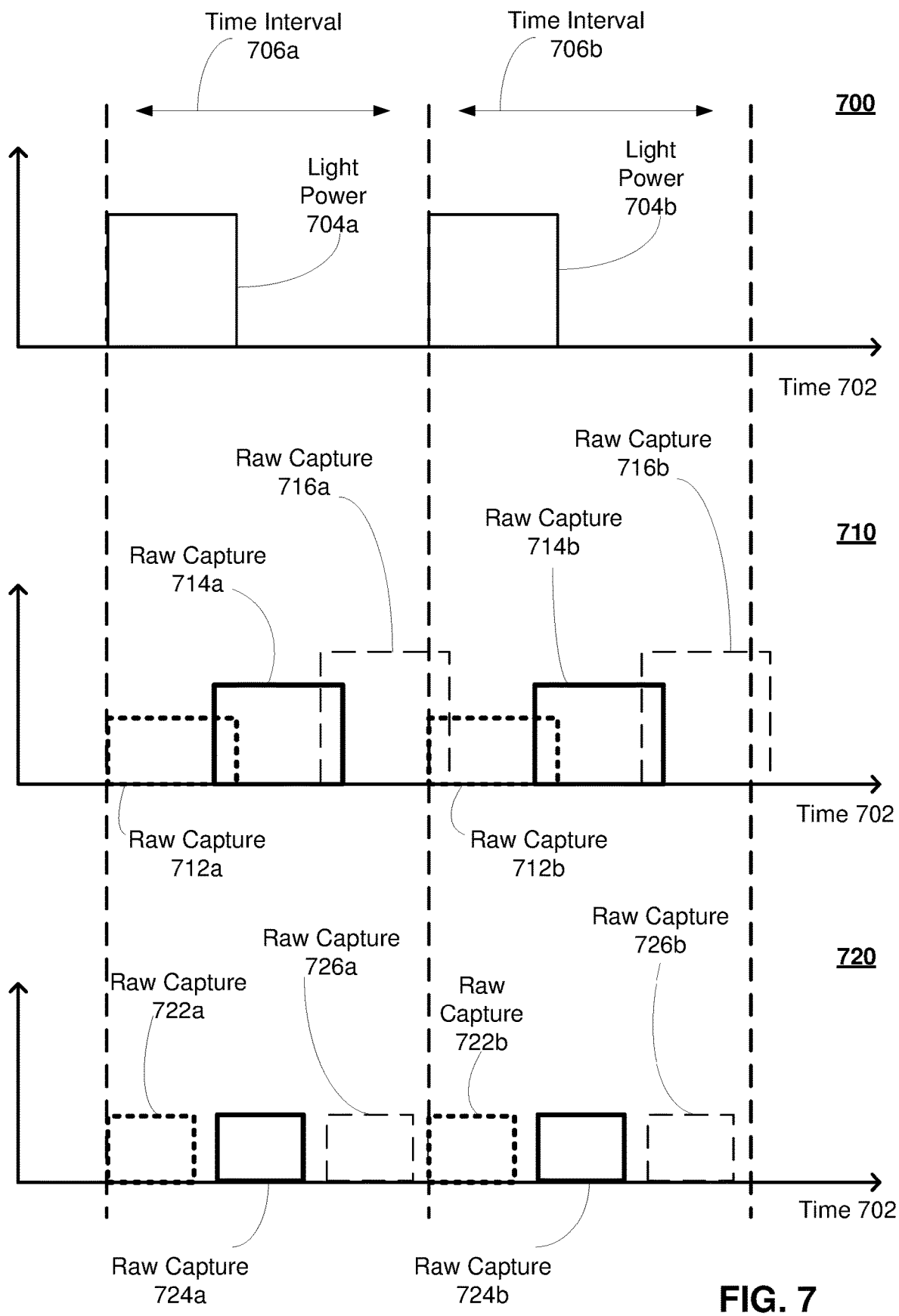
FIG. 7 are timing diagrams relating to the operation of structured TOF depth sensors that utilize the photodiode sensors of FIGS. 6A and 6B, in accordance with one or more embodiments.

FIG. 7 are timing diagrams 700, 710 and 720 relating to the operation of structured TOF depth sensors that utilize the photodiode sensors of FIGS. 6A and 6B, in accordance with one or more embodiments. The timing diagram 710 may correspond to the pixel timing diagram 600 of FIG. 6A, whereas the timing diagram 720 may correspond to the pixel timing diagram 620 of FIG. 6B.

The timing diagrams 700, 710 and 720 include time 702 on the horizontal axis. The time interval shown in FIG. 7 is divided between two time intervals 706a and 706b (collectively 706). During the first time interval 706a, a light source projects light (e.g., structured light) into an environment. This is indicated by the light power 704a. The light source may be the illumination source 402 as described in further detail with reference to FIG. 4. The light power 704a indicates that the light source projects light into an environment for a duration of time that is less than the time interval 706a. Similarly, during time interval 706b, a light source projects light into an environment as indicated by the light power 704b. The light power 704a and the light power 704B produce light of a temporal pulsing frequency. Note that the diagram 700 is basically of two pulses of a series of pulses at the temporal pulsing frequency. Light emitted into the environment as a result of the light power 704a and 704b may reflect off of an object in an environment. The reflected light is incident on a TOF sensor, such as the TOF sensor 404.

In the timing diagram 710, three differently phased raw captures are shown, raw capture 712a and 712b, raw capture 714a and 714b, and raw capture 716a, and 716b. Note that in this embodiment, only one of the raw captures 712a, 714a, 716a would occur over the time interval 706a and only one of the raw captures 712b, 714b, 716b would occur over the time interval 706b, and that they are shown together simply for ease of illustration. For example, the raw captures 712a and 712b could correspond to a capture of pulses of the raw data 606, the raw captures 714a and 714b could correspond to a capture of pulses of the raw data 608, and the raw capture 716a and 716b could correspond to a capture of pulses of the raw data 610. Note the relative difference in timing between each raw capture and its corresponding light power. Accordingly, raw captures 712a, 712b, raw captures 714a, 714b, and raw captures 716a, 716b have different phases relative to each other.

In the pixel charge diagram 720, three differently phased raw captures are shown, raw capture 722a and 722b, raw capture 724a and 724b, and raw capture 726a, and 726b. Note that in this embodiment, each of the raw captures 722a, 724a, 726a occurs over the time interval 706a, and each of the raw captures 722b, 724b, 726b occurs over the time interval 706b. For example, the raw captures 722a, 724a, 726a and the subsequent raw captures 722b, 724b, 726b could correspond to capture of pulses in the raw capture 624. Note that in the illustrated diagram there is a small period between adjacent raw captures of a given timing window. During these small periods, accumulated charge may be transferred to a drain (e.g., stored and not collected, or transferred to the substrate, etc.) In other embodiments, this time period may be minimized (e.g., no space). In some embodiments, the timing between adjacent raw captures may be different (e.g., a time between the raw capture 722a and the raw capture 724a is different than a time between the raw capture 724a and the raw capture 726a).

FIG. 8 is a flow chart of a process 800 for determining a radial distance to an object, in accordance with one or more embodiments. The process 800 may be performed by a DMA (e.g., the DMA 210). In some embodiments, some or all of the steps may be performed and/or shared with other entities (e.g., a processor of a HMD, a console, etc.) Likewise, embodiments may include different and/or additional steps, or perform the steps in different orders.

The DMA projects pulses 802 of light at one or more pulse frequencies into a local area. The pulses of light may be projected by a light source (e.g., the illumination source 170) in accordance with instructions from a controller (e.g., the controller 216). In some embodiments, pulse frequencies of projected light may be between 10-200 MHz. The projected light may be structured light. In some embodiments, the projected light may include one or more pulses of unpatterned flood illumination that are interspersed with the pulses of structured light. The DMA may communicate with a light source via a controller, such as a controller 412, which instructs a light source to project pulses of light at a pulse frequency.

The DMA captures images 804 of pulses of light reflected from the local area. The DMA captures the images using a camera assembly (e.g., the camera assembly 180). The capture assembly captures images in accordance with instructions from a controller of the DMA, such as the controller 412.

The DMA determines 806, using one or more of the captured images, one or more TOF phase shifts for the pulses of light. This may be based in part on the charge accumulated by pixels of a sensor of the camera assembly for each of the phase shifts shown in FIGS. 6A-7. TOF phase shifts are described in further detail with reference to FIG. 4. The TOF phase shifts are related to the pixel charge accumulation as described in further detail with reference to FIG. 4. The one or more TOF phase shifts may be determined by a controller of the DMA, such as the controller 412.

The DMA determines 808 a first set of estimated radial distances to an object in the local area based on the one or more TOF phase shifts. This may be the phase estimates 410 shown in FIG. 4, and/or the detected ranges shown in FIG. 5. The estimated radial distances are based on calculations described in reference to FIG. 4. The one or more TOF phase shifts may correspond to different pulse frequencies of emitted light. The first set of estimated radial distances may be determined by a controller of the DMA, such as the controller 412.

The DMA determines 810 a second estimated radial distance to the object based on an encoding of the structured light and at least one of the captured images. The at least one of the captured images is an image of the local area that is illuminated with a structured light pattern. The controller, such as the controller 412, determines depth information for objects in the local area using the at least one image.

The DMA selects 812 an estimated radial distance from the first set of radial distances, based in part on the second estimated radial distance. In some embodiments, the DMA selects the estimated radial distance based in part on the second estimated radial distance being within a threshold distance of the selected estimated radial distance. Selection may be carried out by a controller of the DMA, such as the controller 412. This may fully disambiguate the estimated radial distances from the TOF phase shifts, and based in part on consulting a LUT with a structured light encoding. Disambiguated estimated radial distances may refer to a $2\pi$ ambiguity in the estimated radial distances, as described in further detail with reference to FIG. 4. This is the final depth estimate of an object in an environment for a region of a local area. The threshold distance may be e.g., within 10% of the estimated radial distance. In some embodiments, the DMA selects the estimated radial distance based in part on a LUT and the second estimated radial distance. In this instance, the DMA inputs the second estimated radial distance to the LUT to determine the estimated radial distance. In some embodiments, the DMA selects the estimated radial distance uses machine learning. In this instance the DMA is trained such that given the second estimated radial distance it is able to select the estimated radial distance. The DMA may use the final depth estimate to determine a depth map of a local environment, such as the local area 260. The DMA may divide a local area 260 into a number of different regions, and collect depth estimates as described above for each region. In some embodiments, a DMA may interpolate between regions. A full depth map of a local area may then be constructed from multiple iterations of the method 800.

System Overview

Figure 9:
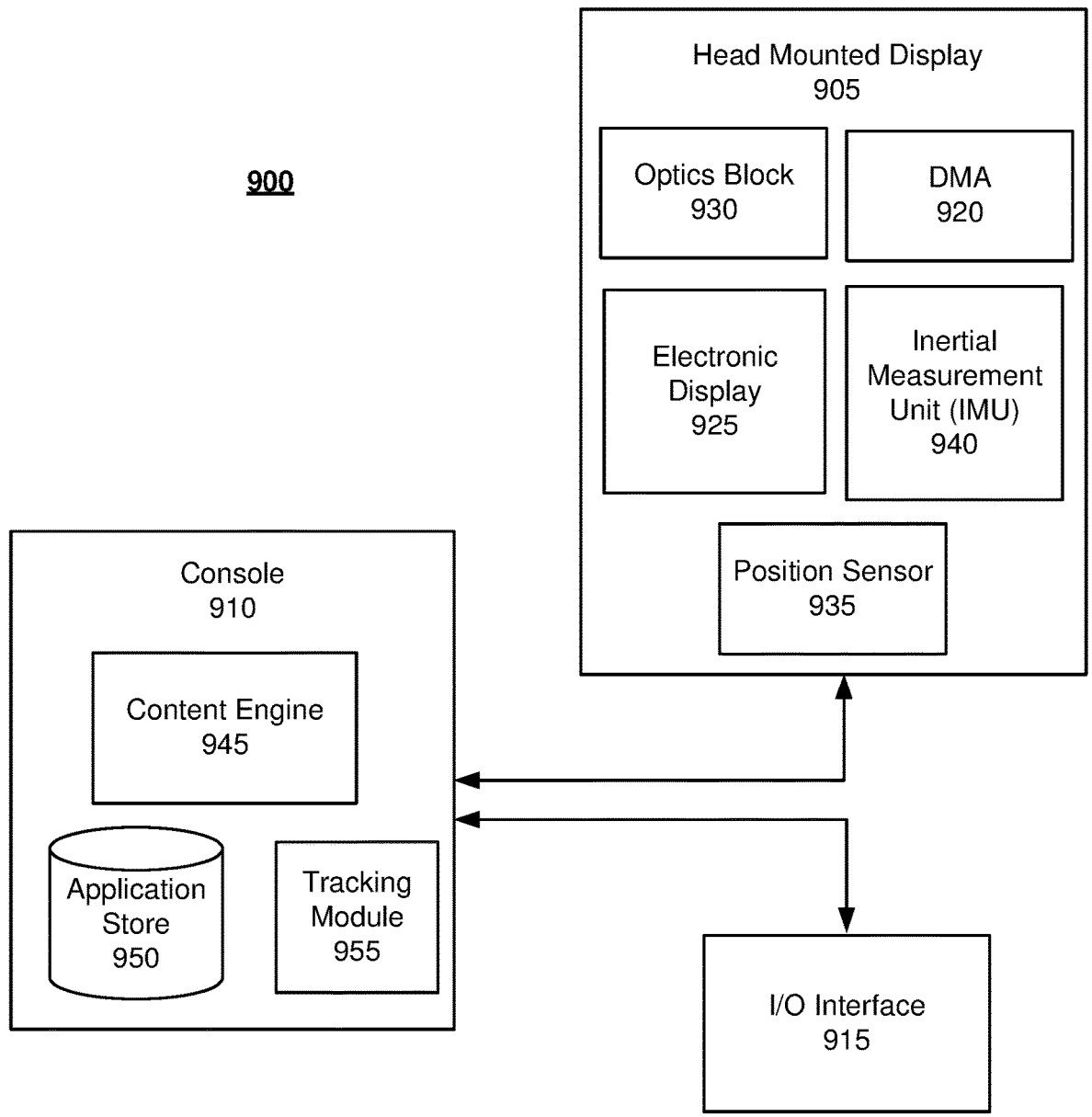
FIG. 9 is a block diagram of a system environment for providing artificial reality content, in accordance with one or more embodiments.

FIG. 9 is a block diagram of a system environment 900 for providing artificial reality content, in accordance with one or more embodiments. The system environment 900 shown in FIG. 9 may provide artificial reality content to users in various embodiments. Additionally or alternatively, the system environment 900 generates one or more virtual environments and presents a virtual environment with which a user may interact to the user. The system environment 900 shown by FIG. 9 comprises a head mounted display (HMD) 905 and an input/output (I/O) interface 915 that is coupled to a console 910. While FIG. 9 shows an example system environment 900 including one HMD 905 and one I/O interface 915, in other embodiments any number of these components may be included in the system environment 900. For example, there may be multiple HMDs 905 each having an associated I/O interface 915, with each HMD 905 and I/O interface 915 communicating with the console 910. In alternative configurations, different and/or additional components may be included in the system environment 900. Additionally, functionality described in conjunction with one or more of the components shown in FIG. 9 may be distributed among the components in a different manner than described in conjunction with FIG. 9 in some embodiments. For example, some or all of the functionality of the console 910 is provided by the HMD 905.

The head mounted display (HMD) 905 presents content to a user comprising augmented views of a physical, real-world environment with computer-generated elements (e.g., two dimensional (2D) or three dimensional (3D) images, 2D or 3D video, sound, etc.) or presents content comprising a virtual environment. In some embodiments, the presented content includes audio that is presented via an external device (e.g., speakers and/or headphones) that receives audio information from the HMD 905, the console 910, or both, and presents audio data based on the audio information. An embodiment of the HMD 905 is further described in conjunction with FIGS. 1 and 2. The HMD 905 may also be a near-eye display.

The HMD 905 includes a DMA 920, an electronic display 925, an optics block 930, one or more position sensors 935, and an IMU 940. The HMD 905 may be the HMD 100 as shown in FIGS. 1-2. The DMA 920 may be the DMA 210, the electronic display 925 may be the electronic display 220, and the optics block may be the optics block 230 as described in further detail with respect to FIG. 2. The position sensors 935 may be the position sensors 150 and the IMU 940 may be the IMU 140 as described in further detail with respect to FIG. 1. Some embodiments of the HMD 905 have different components than those described in conjunction with FIG. 9. Additionally, the functionality provided by various components described in conjunction with FIG. 9 may be differently distributed among the components of the HMD 905 in other embodiments.

The DMA 920 captures data describing depth information of an area surrounding the HMD 905. The DMA 920 includes a light source, such as the illumination source 402 and/or the illumination source 170, which projects light into an environment, such as the local area 260 as shown in FIG. 2. The DMA 920 includes a camera assembly, such as the camera assembly 180. A sensor which collects charge relating to a TOF phase shift of reflected light, such as the sensor 404, may be one element of the camera assembly. A controller of the DMA determines a number of radial depth estimates from the TOF phase shifts. A structured light encoding is used to select from the radial depth estimates, and a second depth estimation from a triangulation calculation of a captured image is combined with the estimated radial depth. The triangulation calculation may be of lessor resolution than the estimated radial depth, however it is sufficient to disambiguate between a number of radial depth estimates. The radial depth estimate is then combined with a triangulation calculation to determine a depth of an object in the environment. This process is described in further detail with reference to FIGS. 2-8.

The electronic display 925 displays 2D or 3D images to the user in accordance with data received from the console 910. In various embodiments, the electronic display 925 comprises a single electronic display or multiple electronic displays (e.g., a display for each eye of a user). Examples of the electronic display 925 include: a liquid crystal display (LCD), an organic light emitting diode (OLED) display, an active-matrix organic light-emitting diode display (AMOLED), some other display, or some combination thereof.

The optics block 930 magnifies image light received from the electronic display 925, corrects optical errors associated with the image light, and presents the corrected image light to a user of the HMD 905. In various embodiments, the optics block 930 includes one or more optical elements. Example optical elements included in the optics block 930 include: an aperture, a Fresnel lens, a convex lens, a concave lens, a filter, a reflecting surface, or any other suitable optical element that affects image light. Moreover, the optics block 930 may include combinations of different optical elements. In some embodiments, one or more of the optical elements in the optics block 930 may have one or more coatings, such as anti-reflective coatings.

Magnification and focusing of the image light by the optics block 930 allows the electronic display 925 to be physically smaller, weigh less and consume less power than larger displays. Additionally, magnification may increase the field of view of the content presented by the electronic display 925. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 930 may be designed to correct one or more types of optical error. Examples of optical error include barrel distortions, pincushion distortions, longitudinal chromatic aberrations, or transverse chromatic aberrations. Other types of optical errors may further include spherical aberrations, comatic aberrations or errors due to the lens field curvature, astigmatisms, or any other type of optical error. In some embodiments, content provided to the electronic display 925 for display is pre-distorted, and the optics block 930 corrects the distortion when it receives image light from the electronic display 925 generated based on the content.

The IMU 940 is an electronic device that generates data indicating a position of the HMD 905 based on measurement signals received from one or more of the position sensors 935 and from depth information received from the DMA 920. A position sensor 935 generates one or more measurement signals in response to motion of the HMD 905. Examples of position sensors 935 include: one or more accelerometers, one or more gyroscopes, one or more magnetometers, another suitable type of sensor that detects motion, a type of sensor used for error correction of the IMU 940, or some combination thereof. The position sensors 935 may be located external to the IMU 940, internal to the IMU 940, or some combination thereof.

Based on the one or more measurement signals from one or more position sensors 935, the IMU 940 generates data indicating an estimated current position of the HMD 905 relative to an initial position of the HMD 905. For example, the position sensors 935 include multiple accelerometers to measure translational motion (forward/back, up/down, left/right) and multiple gyroscopes to measure rotational motion (e.g., pitch, yaw, roll). In some embodiments, the IMU 940 rapidly samples the measurement signals and calculates the estimated current position of the HMD 905 from the sampled data. For example, the IMU 940 integrates the measurement signals received from the accelerometers over time to estimate a velocity vector and integrates the velocity vector over time to determine an estimated current position of a reference point on the HMD 905. Alternatively, the IMU 940 provides the sampled measurement signals to the console 910, which interprets the data to reduce error. The reference point is a point that may be used to describe the position of the HMD 905. The reference point may generally be defined as a point in space or a position related to the HMD's 905 orientation and position.

The IMU 940 receives one or more parameters from the console 910. As further discussed below, the one or more parameters are used to maintain tracking of the HMD 905. Based on a received parameter, the IMU 940 may adjust one or more IMU parameters (e.g., sample rate). In some embodiments, certain parameters cause the IMU 940 to update an initial position of the reference point so it corresponds to a next position of the reference point. Updating the initial position of the reference point as the next calibrated position of the reference point helps reduce accumulated error associated with the current position estimated the IMU 940. The accumulated error, also referred to as drift error, causes the estimated position of the reference point to "drift" away from the actual position of the reference point over time. In some embodiments of the HMD 905, the IMU 940 may be a dedicated hardware component. In other embodiments, the IMU 940 may be a software component implemented in one or more processors.

The I/O interface 915 is a device that allows a user to send action requests and receive responses from the console 910. An action request is a request to perform a particular action. For example, an action request may be an instruction to start or end capture of image or video data or an instruction to perform a particular action within an application. The I/O interface 915 may include one or more input devices. Example input devices include: a keyboard, a mouse, a game controller, or any other suitable device for receiving action requests and communicating the action requests to the console 910. An action request received by the I/O interface 915 is communicated to the console 910, which performs an action corresponding to the action request. In some embodiments, the I/O interface 915 includes an IMU 940, as further described above, that captures calibration data indicating an estimated position of the I/O interface 915 relative to an initial position of the I/O interface 915. In some embodiments, the I/O interface 915 may provide haptic feedback to the user in accordance with instructions received from the console 910. For example, haptic feedback is provided when an action request is received, or the console 910 communicates instructions to the I/O interface 915 causing the I/O interface 915 to generate haptic feedback when the console 910 performs an action.

The console 910 provides content to the HMD 905 for processing in accordance with information received from one or more of: the DMA 920, the HMD 905, and the VR I/O interface 915. In the example shown in FIG. 1, the console 910 includes an application store 950, a tracking module 955 and a content engine 945. Some embodiments of the console 910 have different modules or components than those described in conjunction with FIG. 9. Similarly, the functions further described below may be distributed among components of the console 910 in a different manner than described in conjunction with FIG. 9.

The application store 950 stores one or more applications for execution by the console 910. An application is a group of instructions, that when executed by a processor, generates content for presentation to the user. Content generated by an application may be in response to inputs received from the user via movement of the HMD 905 or the I/O interface 915. Examples of applications include: gaming applications, conferencing applications, video playback applications, or other suitable applications.

The tracking module 955 tracks movements of the HMD 905 or of the I/O interface 915 using information from the DMA 920, the one or more position sensors 935, the IMU 940 or some combination thereof. For example, the tracking module 955 determines a position of a reference point of the HMD 905 in a mapping of a local area based on information from the HMD 905. The tracking module 955 may also determine positions of the reference point of the HMD 905 or a reference point of the I/O interface 915 using data indicating a position of the HMD 905 from the IMU 940 or using data indicating a position of the I/O interface 915 from an IMU 940 included in the I/O interface 915, respectively. Additionally, in some embodiments, the tracking module 955 may use portions of data indicating a position of the HMD 905 from the IMU 940 as well as representations of the local area from the DMA 920 to predict a future location of the HMD 905. The tracking module 955 provides the estimated or predicted future position of the HMD 905 or the I/O interface 915 to the content engine 945.

The content engine 945 generates a 3D mapping of the area surrounding the HMD 905 (i.e., the "local area") based on information received from the DMA 920 included in the HMD 905. In some embodiments, the content engine 945 determines depth information for the 3D mapping of the local area based on depths determined by each pixel of the sensor in the imaging device from a phase shift determined from relative intensities captured by a pixel of the sensor in multiple images. In various embodiments, the content engine 945 uses different types of information determined by the DMA 920 or a combination of types of information determined by the DMA 920 to generate the 3D mapping of the local area.

The content engine 945 also executes applications within the system environment 900 and receives position information, acceleration information, velocity information, predicted future positions, or some combination thereof, of the HMD 905 from the tracking module 955. Based on the received information, the content engine 945 determines content to provide to the HMD 905 for presentation to the user. For example, if the received information indicates that the user has looked to the left, the content engine 945 generates content for the HMD 905 that mirrors the user's movement in a virtual environment or in an environment augmenting the local area with additional content. Additionally, the content engine 945 performs an action within an application executing on the console 910 in response to an action request received from the I/O interface 915 and provides feedback to the user that the action was performed. The provided feedback may be visual or audible feedback via the HMD 905 or haptic feedback via the I/O interface 915.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth measurement assembly (DMA) comprising:
an illumination source configured to project pulses of light at one or more temporal pulsing frequencies into a local area, wherein the pulses of light include at least one structured light pulse that has a spatial pattern;
a sensor configured to:
sense the pulses of light reflected from the local area, the pulses of light sensed by the senor including the structured light pulse, and
determine, based at least in part on the pulses of light sensed by the sensor, one or more time of flight (TOF) measurements for the pulses of light; and
a controller coupled to the sensor and configured to:
determine a first set of estimated radial distances to an object in the local area based on the one or more TOF measurements,
determine a second estimated radial distance to the object via one or more triangulation calculations applied to the sensed structured light pulse, and
select an estimated radial distance from the first set of estimated radial distances, based in part on the second estimated radial distance.

2. The DMA of claim 1, wherein the illumination source is configured to project pulses of structured light at a first temporal pulsing frequency at a first time, and at a second temporal pulsing frequency at a second time subsequent to the first time.

3. The DMA of claim 2, wherein the sensor, for each of the first temporal pulsing frequency and the second temporal pulsing frequency, is configured to:
capture a first raw data using a first gated shutter window with a first timing shift;
capture a second raw data in a second gated shutter window with a second timing shift; and
capture a third raw data in a third gated shutter window with a first timing shift.

4. The DMA of claim 3, wherein the first raw data at the first temporal pulsing frequency is read out prior to capturing the second raw data, and the second raw data at the first temporal pulsing frequency is read out prior to capturing the third raw data at the first temporal pulsing frequency.

5. The DMA of claim 2, wherein the sensor comprises a plurality of augmented pixels, and each augmented pixel includes three charge storage regions, wherein at the first temporal pulsing frequency, a first charge storage region collects charge associated with a first raw capture in a first gated shutter window with a first timing shift, a second set of charge storage regions collects charge associated with the first raw capture in a second gated shutter window with a second timing shift, and a third set of charge storage regions collects charge associated with the first raw capture in a third gated shutter window with a third timing shift.

6. The DMA of claim 5, wherein at the second temporal pulsing frequency the first charge storage region collects charge associated with a second raw capture in a first gated shutter window with a first timing shift, the second set of charge storage regions collects charge associated with the second raw capture in a second gated shutter window with a second timing shift, and the third set of charge storage regions collects charge associated with the second raw capture in a third gated shutter window with a third timing shift.

7. The DMA of claim 6, wherein the first raw capture at the first temporal pulsing frequency is read out prior to the second raw capture at the second temporal pulsing frequency.

8. The DMA of claim 1, wherein the projected pulses of light are composed of flood illumination overlaid with the spatial pattern, wherein the spatial pattern is a dot pattern and each dot in the dot pattern has a brightness that is brighter than a brightness of the flood illumination.

9. The DMA of claim 1, wherein the projected pulses of light are composed of flood illumination overlaid with the spatial pattern, wherein the spatial pattern is a dot pattern and each dot in the dot pattern has a brightness value that is less than a brightness value of the flood illumination.

10. The DMA of claim 1, wherein a distance between the light projector and the sensor is 50 mm or less.

11. The DMA of claim 1, wherein the controller is further configured to obtain a depth map of the local area based on the selected estimated radial distance from the first set of radial distances.

12. A method comprising:
determining a first set of estimated radial distances to an object in a local area based on one or more TOF measurements, the one or more TOF measurements determined using sensed reflections of at least some of a plurality of pulses of light that were projected into the local area, wherein the pulses of light are at one or more temporal pulsing frequencies and include at least one structured light pulse that has a spatial pattern;
determining a second estimated radial distance to the object via one or more triangulation calculations applied to the sensed structured light pulse; and
selecting an estimated radial distance from the first set of estimated radial distances, based in part on the second estimated radial distance.

13. The method of claim 12, further comprising:
projecting the pulses of light at the one or more temporal pulsing frequencies into the local area.

14. The method of claim 13, further comprising:
sensing the pulses of light reflected from the local area, the sensed pulses including the structured light pulse; and
determining, based at least in part on the sensed pulses, the one or more time of flight (TOF) measurements.

15. The method claim 14, wherein projecting the pulses of light at the one or more temporal pulsing frequencies into the local area, comprises:
projecting pulses of structured light at a first temporal pulsing frequency at a first time, and at a second temporal pulsing frequency at a second time subsequent to the first time.

16. The method of claim 14, wherein for each of the first temporal pulsing frequency and the second temporal pulsing frequency, the method further comprises:
capturing a first raw data using a first gated shutter window with a first timing shift;
capturing a second raw data in a second gated shutter window with a second timing shift; and
capturing a third raw data in a third gated shutter window with a first timing shift.

17. The method of claim 12, wherein the pulses of light are composed of flood illumination overlaid with the spatial pattern, wherein the spatial pattern is a dot pattern and each dot in the dot pattern has a brightness that is brighter than a brightness of the flood illumination.

18. The method of claim 12, wherein the pulses of light are composed of flood illumination overlaid with the spatial pattern, wherein the spatial pattern is a dot pattern and each dot in the dot pattern has a brightness value that is less than a brightness value of the flood illumination.

19. The method of claim 12, the method further comprising:
obtaining a depth map of the local area based on the selected estimated radial distance from the first set of radial distances.

20. A non-transitory computer readable medium configured to store program code instructions, when executed by a processor, cause the processor to perform steps comprising:
determining a first set of estimated radial distances to an object in a local area based on one or more TOF measurements, the one or more TOF measurements determined using sensed reflections of at least some of a plurality of pulses of light that were projected into the local area, wherein the pulses of light are at one or more temporal pulsing frequencies and include at least one structured light pulse that has a spatial pattern;
determining a second estimated radial distance to the object via one or more triangulation calculations applied to the sensed structured light pulse; and
selecting an estimated radial distance from the first set of radial distances, based in part on the second estimated radial distance.

* * * * *

UNITED STATES PATENT AND TRADEMARK OFFICE
CERTIFICATE OF CORRECTION

| | | |
|---|---|---|
| PATENT NO. | : 11,132,805 B2 | Page 1 of 1 |
| APPLICATION NO. | : 17/108213 | |
| DATED | : September 28, 2021 | |
| INVENTOR(S) | : Michael Hall | |

It is certified that error appears in the above-identified patent and that said Letters Patent is hereby corrected as shown below:

In the Claims

In Column 24, Claim 15, Line 10, delete "method claim" and insert -- method of claim --, therefor.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*